United States Patent [19]
Smoot

[11] 3,787,953
[45] Jan. 29, 1974

[54] SPARE TIRE REMOVAL SYSTEM

[75] Inventor: Edward H. Smoot, Holcomb, N.Y.

[73] Assignee: The Schlegel Manufacturing Company, Rochester, N.Y.

[22] Filed: Mar. 17, 1972

[21] Appl. No.: 235,596

[52] U.S. Cl.............................. 29/427, 254/93 HP
[51] Int. Cl............................................ B23p 19/02
[58] Field of Search..... 296/37.2, 37; 214/451, 454; 254/93 HD; 29/427

[56] References Cited
UNITED STATES PATENTS
| | | | |
|---|---|---|---|
| 2,328,970 | 9/1943 | Farquhar | 254/93 HP |
| 1,493,729 | 5/1924 | Brown | 254/93 HP |
| 3,565,398 | 2/1971 | Floria | 254/93 HP |
| 3,523,679 | 8/1970 | Clay | 254/93 HP |

Primary Examiner—Charles W. Lanham
Assistant Examiner—James R. Duzan
Attorney, Agent, or Firm—Cumpston, Shaw & Stephens

[57] ABSTRACT

A spare tire and wheel is raised from the spare wheel well of a station wagon by using excess air from the spare tire for inflating an inflatable body in the wheel well under the spare tire. An air line connecting the spare tire and the inflatable body has a normally-closed valve that is operated to accomplish the inflation and raise the spare tire and wheel from the well.

3 Claims, 4 Drawing Figures

PATENTED JAN 29 1974　　　　　　　　　　　　　　3,787,953

SPARE TIRE REMOVAL SYSTEM

THE INVENTIVE IMPROVEMENT

The invention involves recognition of a need for a better way to remove the spare tire and wheel from the wheel well of a station wagon. In many station wagons, the spare tire is about half buried in a wheel well forward of the tailgate opening. Considerable strength is needed to raise the spare wheel from the well, partly because the lifting position is awkward and requires reaching inward from the tailgate opening and lifting upward at arms's length. This feat is beyond the strength of many people.

The invention proposes a simple, economical, and expedient way of raising the spare wheel from the wheel well so that its removal from the station wagon is quite simple and convenient. The invention also involves recognition of a convenient power supply available in the region of the spare wheel and conception of a simple way to apply the power supply to the task of raising the wheel from the well for easy removal.

SUMMARY OF THE INVENTION

The inventive spare tire and wheel removing means includes a normally uninflated and inflatable body in the wheel well underneath the spare tire and wheel, an air line connecting the inflatable body with the spare tire, a normally closed valve in the air line, and means for opening the valve to admit excess air from the spare tire into the body to inflate the body and raise the spare tire and wheel upward from the wheel well.

DRAWINGS

FIGS. 1 and 2 are partially schematic, fragmentary, elevational views of a spare wheel removal system operated according to the invention; and FIGS. 3 and 4 are partially schematic, fragmentary, elevational views of an alternative wheel removing system operated according to the invention.

DETAILED DESCRIPTION

Figures 1, 2:
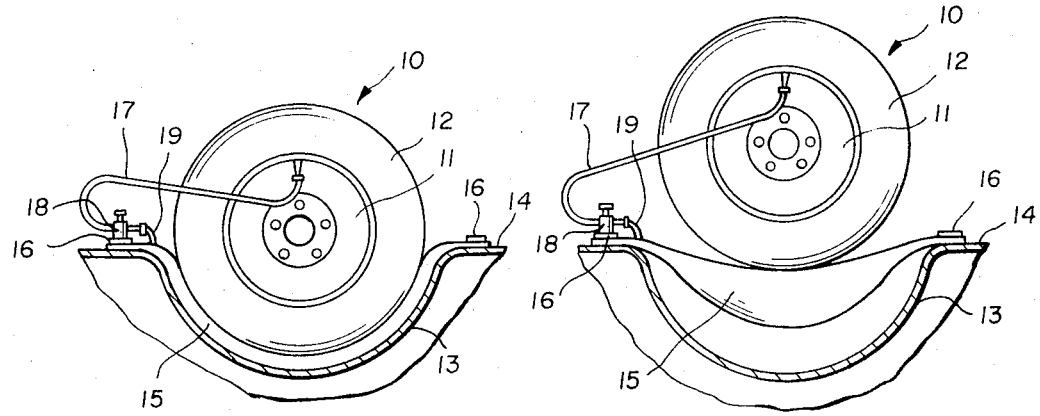

Spare tire and wheel 10 including a spare tire 12 and a spare wheel 11, is normally stored in a station wagon wheel well 13 recessed below deck 14 as is generally known. According to the inventive embodiment illustrated in FIGS. 1 and 2, an uninflated and inflatable body 15 is arranged in the bottom of wheel well 13 under spare wheel 10 and secured in place by mountings 16. An air line 17 extends from spare tire 12 to a manually operable valve 18 that is normally closed. An air line 19 extends from valve 18 into body 15.

Spare tire 12 is over-inflated when stored to have an excess air supply in addition to what will be needed if spare wheel 10 is mounted on the vehicle. This creates a usable supply of pressurized air in tire 12 that can be used for raising wheel 10 from well 13.

FIG. 2 shows the effect of opening valve 18 to admit sufficient air from tire 12 into body 15 to raise tire and wheel 10 from well 13. The valve 18 is closed, air line 17 is disconnected from tire 12, and wheel 10 is easily rolled out of the station wagon.

Figures 3, 4:
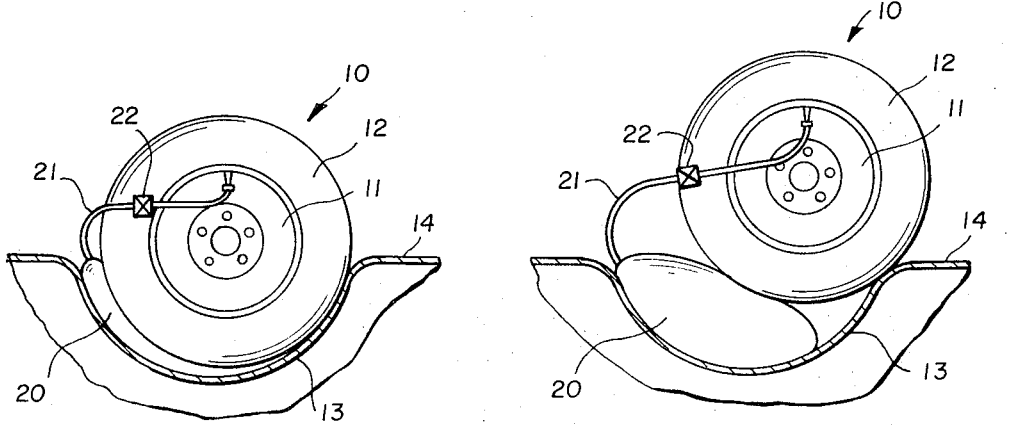

The alternative system shown in FIGS. 3 and 4 is similar except that inflatable body 20 is somewhat simpler than body 15 and instead of being secured in place by mountings, is merely loose in well 13, or held by adhesive or some other simple fastener. A flexible air line 21 includes a normally-closed valve 22 and leads from tire 12 to body 20 for inflating body 20 as shown in FIG. 4 to raise wheel 10 from well 13. Also, as shown in FIG. 4, it is not necessary to raise wheel 10 completely out of well 13 but only necessary to raise it sufficiently so that it rolls fairly easily over the upper edge of well 13 and out along the deck 14 of the station wagon.

Those skilled in the art will appreciate that many sizes and shapes of inflatable bodies can be formed of many different materials and secured in place in various ways in wheel well 13 for inflation to raise the spare wheel. Also, many air lines and valves are available to control the flow of air from the spare tire to the inflated body for raising the spare wheel when and as desired. Such valves are preferably manually controllable to avoid excessive inflation of the body in the wheel well or excessive deflation of the spare tire. After the spare tire and wheel is removed from the station wagon, the inflated body in the wheel well can be deflated by opening the same valve so that another spare tire and wheel can be stored in the wheel well.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand the materials, valving, and application of the invention system to particular circumstances.

I claim:

1. Means for removing a spare tire and wheel from a spare wheel well of a station wagon, said means comprising:
   a. a normally uninflated and inflatable body in a lower region of said wheel well;
   b. said spare tire and wheel being normally in said wheel well and resting on said uninflated body;
   c. said spare tire normally containing excess air;
   d. an air line connecting said spare tire and said body;
   e. a normally-closed valve in said air line; and
   f. manually-operable means for opening said valve to admit said excess air from said spare tire into said body to inflate said body and raise said spare tire and wheel upward toward the top of said wheel well.

2. The means of claim 1 including means for securing said body in place in said wheel well.

3. A method of removing a spare tire and wheel from a spare wheel well of a station wagon, said method comprising:
   a. placing an uninflated and inflatable body in a lower region of said wheel well;
   b. placing said spare tire and wheel in said wheel well to rest on said uninflated body;
   c. over-inflating said spare tire to provide an excess of pressurized air;
   d. connecting said pressurized air supply in said spare tire to said body through an air line having a normally-closed valve;
   e. opening said valve to admit sufficient air from said excess air supply in said spare tire into said body to inflate said body and raise said spare tire and wheel upward toward the top of said wheel well, and then re-closing said valve; and
   f. disconnecting said air line from said spare tire and removing said spare tire and wheel from said wheel well.

* * * * *